United States Patent
Ward et al.

(10) Patent No.: US 7,032,013 B2
(45) Date of Patent: Apr. 18, 2006

(54) RELIABILITY FOR INTERCONNECT FABRICS

(75) Inventors: Julie Ann Ward, Menlo Park, CA (US); Troy Alexander Shahoumian, Sunnyvale, CA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 728 days.

(21) Appl. No.: 10/027,589

(22) Filed: Dec. 19, 2001

(65) Prior Publication Data

US 2002/0091845 A1  Jul. 11, 2002

Related U.S. Application Data

(63) Continuation-in-part of application No. 09/707,227, filed on Nov. 6, 2000.

(51) Int. Cl.
*G06F 15/177* (2006.01)

(52) U.S. Cl. ....................... 709/220; 709/236

(58) Field of Classification Search ................ 709/238, 709/242, 232, 249, 247, 227, 220, 221, 252, 709/228; 710/317, 305, 104, 14; 370/360, 370/403, 397, 537, 401; 714/738, 47; 707/200; 718/105; 717/173, 11; 711/121; 713/1–5; 340/825

See application file for complete search history.

(56) References Cited

U.S. PATENT DOCUMENTS

| | | | | |
|---|---|---|---|---|
| 4,446,515 A | * | 5/1984 | Sauer et al. ................ | 709/252 |
| 4,920,487 A | * | 4/1990 | Baffes ........................ | 718/105 |
| 5,107,489 A | * | 4/1992 | Brown et al. ............... | 370/360 |
| 5,113,496 A | * | 5/1992 | McCalley et al. .......... | 710/305 |
| 5,138,657 A | | 8/1992 | Colton et al. | |
| 5,245,609 A | | 9/1993 | Ofek et al. | |
| 5,307,449 A | * | 4/1994 | Kelley et al. ............... | 345/419 |
| 5,329,619 A | * | 7/1994 | Page et al. | |
| 5,426,674 A | | 6/1995 | Nemirovsky et al. | |
| 5,524,212 A | * | 6/1996 | Somani et al. ............. | 711/121 |
| 5,581,689 A | | 12/1996 | Slominski et al. | |
| 5,598,532 A | | 1/1997 | Liron | |
| 5,634,004 A | * | 5/1997 | Gopinath et al. ........... | 710/317 |
| 5,634,011 A | * | 5/1997 | Auerbach et al. .......... | 709/242 |
| 5,649,105 A | | 7/1997 | Aldred et al. | |
| 5,651,005 A | | 7/1997 | Kwok et al. | |

(Continued)

FOREIGN PATENT DOCUMENTS

WO  WO-96/17458 A  6/1996

OTHER PUBLICATIONS

Integrated Scheduling of Unicast and Multicast Traffic . . . —Andrews, Khanna, Kumaran (1999) cm.bell-labs.com/cm/ms/who/sanjeev/postscriptum/infocom99_packet.ps.gz.*

(Continued)

*Primary Examiner*—Thong Vu
(74) *Attorney, Agent, or Firm*—Richard P. Lange

(57) ABSTRACT

A technique for providing reliability to an interconnect fabric for communication among a set of nodes. Ports associated with each node are partitioned into a first set of ports and a second set of ports. A first interconnect fabric is formed among the first set of ports for each node in response to a set of flow requirements. A second interconnect fabric is formed among the second set of ports. Reliability is enhanced because, in the event of a failure of any single element of the first interconnect fabric, the flows among the nodes can still be achieved by the second interconnect fabric.

24 Claims, 10 Drawing Sheets

U.S. PATENT DOCUMENTS

| | | | |
|---|---|---|---|
| 5,793,362 A | 8/1998 | Matthews et al. | |
| 5,805,578 A | 9/1998 | Stirpe et al. | |
| 5,815,402 A | 9/1998 | Taylor et al. | |
| 5,831,996 A * | 11/1998 | Abramovici et al. | 714/738 |
| 5,835,498 A * | 11/1998 | Kim et al. | 370/537 |
| 5,838,919 A | 11/1998 | Schwaller et al. | |
| 5,854,903 A * | 12/1998 | Morrison et al. | 709/249 |
| 5,857,180 A * | 1/1999 | Hallmark et al. | 707/2 |
| 5,878,232 A * | 3/1999 | Marimuthu | 709/249 |
| 5,970,232 A * | 10/1999 | Passint et al. | 709/238 |
| 5,987,517 A | 11/1999 | Firth et al. | |
| 6,003,037 A | 12/1999 | Kassabgi et al. | |
| 6,031,984 A | 2/2000 | Walser | |
| 6,038,219 A | 3/2000 | Mawhinney et al. | |
| 6,047,199 A | 4/2000 | DeMarco | |
| 6,052,360 A | 4/2000 | Rogers | |
| 6,108,782 A | 8/2000 | Fletcher et al. | |
| 6,141,355 A | 10/2000 | Palmer et al. | |
| 6,148,000 A * | 11/2000 | Feldman et al. | 370/397 |
| 6,157,645 A | 12/2000 | Shobatake | |
| 6,195,355 B1 * | 2/2001 | Demizu | 370/397 |
| 6,212,568 B1 | 4/2001 | Miller et al. | |
| 6,253,339 B1 * | 6/2001 | Tse et al. | 714/47 |
| 6,331,905 B1 | 12/2001 | Ellinas et al. | |
| 6,345,048 B1 | 2/2002 | Allen et al. | |
| 6,363,334 B1 | 3/2002 | Andrews et al. | |
| 6,418,481 B1 | 7/2002 | Mancusi et al. | |
| 6,442,584 B1 | 8/2002 | Kolli et al. | |
| 6,452,924 B1 | 9/2002 | Golden et al. | |
| 6,526,240 B1 | 2/2003 | Thomas et al. | |
| 6,539,027 B1 | 3/2003 | Cambron | |
| 6,539,531 B1 | 3/2003 | Miller et al. | |
| 6,557,169 B1 * | 4/2003 | Erpeldinger | 717/173 |
| 6,570,850 B1 | 5/2003 | Gutierrez et al. | |
| 6,594,701 B1 * | 7/2003 | Forin | 709/232 |
| 6,598,080 B1 | 7/2003 | Nagami et al. | |
| 6,603,769 B1 * | 8/2003 | Thubert et al. | 370/401 |
| 6,611,872 B1 * | 8/2003 | McCanne | 709/238 |
| 6,614,796 B1 * | 9/2003 | Black et al. | 370/403 |
| 6,625,777 B1 | 9/2003 | Levin et al. | |
| 6,628,649 B1 * | 9/2003 | Raj et al. | 370/360 |
| 6,633,909 B1 | 10/2003 | Barrett et al. | |
| 6,650,639 B1 | 11/2003 | Doherty et al. | |
| 6,668,308 B1 | 12/2003 | Barroso et al. | |
| 6,675,328 B1 | 1/2004 | Krishnarnachari et al. | |
| 6,687,222 B1 | 2/2004 | Albert et al. | |
| 6,694,361 B1 | 2/2004 | Shah et al. | |
| 6,697,334 B1 | 2/2004 | Klincewicz et al. | |
| 6,697,369 B1 | 2/2004 | Dziong et al. | |
| 6,697,854 B1 | 2/2004 | Glassen et al. | |
| 6,701,327 B1 * | 3/2004 | Jones et al. | 707/200 |
| 6,724,757 B1 | 4/2004 | Zadikian et al. | |
| 6,744,767 B1 | 6/2004 | Chiu et al. | |
| 6,757,731 B1 * | 6/2004 | Barnes et al. | 709/227 |
| 6,766,381 B1 * | 7/2004 | Barker et al. | 709/246 |
| 6,778,496 B1 | 8/2004 | Meempat et al. | |
| 6,804,245 B1 | 10/2004 | Mitchem et al. | |
| 6,857,027 B1 | 2/2005 | Lindeborg et al. | |
| 2002/0083159 A1 * | 6/2002 | Ward et al. | 709/220 |
| 2002/0091804 A1 | 7/2002 | Ward et al. | |
| 2002/0120770 A1 | 8/2002 | Parham et al. | |
| 2002/0156828 A1 | 10/2002 | Ishizaki et al. | |
| 2002/0188732 A1 | 12/2002 | Buckman et al. | |
| 2003/0065758 A1 | 4/2003 | O'Sullivan et al. | |
| 2003/0144822 A1 | 7/2003 | Peh et al. | |
| 2003/0145294 A1 | 7/2003 | Ward et al. | |
| 2005/0021583 A1 | 1/2005 | Andrzejak et al. | |
| 2005/0021831 A1 | 1/2005 | Andrzejak et al. | |
| 2005/0033844 A1 | 2/2005 | Andrzejak et al. | |

OTHER PUBLICATIONS

Weighted Arbitration Algorithms with Priorities for . . . —Schoenen, Post, Sander (1999) www.iss.rwth-aachen.de/Projekte/Theo/papers/Schoenen99bssw.ps.gz.*

Structural Reuse In The Design Of Atm Switch Fabrics—Oryal Tanir Bell www.sel.iit.nrc.ca/~erdogmus/papers/Arch-Reuse/WCSS97.pdf.*

Interconnect-Driven Floorplanning with Fast Global Wiring . . . —Chang, Cong, Pan, Yuan (2000) cadlab.cs.ucla.edu/~pan/publications/techcon00_idfp.ps.*

Topology Control of Multihop Wireless Networks using . . . —Ramanathan, Rosales-Hain (2000) www.ieee-infocom.org/2000/papers/538.ps.*

Limits on Interconnection Network Performance—Agarwal (1991) ftp.cag.Ics.mit.edu/papers/limits-to-interconnect.ps.Z.*

Ravindra K. Ahuja et al., Network Flows: Theory, Algorithms, and Applications, pp. 4-9, 649-686, 1993, Prentice-Hall, Upper Saddle River, NJ.

Dimitri P. Bertsekas, Linear Network Optimization: Algorithms and Codes, pp. 253-260, 1991, The MIT Press, Cambridge, MA.

Robert E. Bixby, Solving Real-World Linear Programs: A Decade and More of Progress, Jan. 2002.

Viraphol Chaiyakul, Assignment Decision Diagram for High-Level Synthesis, Technical Report #92-103, 1992, Department of Information and Computer Science, University of California, Irvine, CA.

Andre Dehon, Notes on Coupling Processors with Reconfigurable Logic, MIT Transit Project, Transit Note #118, 1995.

Julie Ward Drew et al., U.S. Appl. No. 10/290,760, filed Nov. 8, 2002.

Julie Ward Drew, U.S. Appl. No. 10/290,643, filed Nov. 8, 2002.

Julie Ward Drew et al., U.S. Appl. No. 10/845,855, filed May 13, 2004.

Christodoulos A. Floudas et al., Quadratic Optimization, 1995.

Cathy Fulton et al., Impact Analysis of Packet-Level Scheduling On an ATM Shared-Memory Switch, NFOCOM '98, Proceedibgs of Seventeenth Annual Joint Conference of the IEEE Computer and Communications Societies, vol. 3, pp. 947-954, 1998, IEEE, New York, NY.

Hiroshi Inose, An Introduction to Digital Integrated Communication Systems, pp. 87-90, 1979, Peter Peregrinus Ltd., Stevenage, United Kingdom.

D. Klingman et al. Netgen: A Program for Generating Large Scale Capacitated Assignment, Transportation, and Minimum Cost Flow Network Problems, Management Science 20(5):814-821, 1974, The Institute Of Management Sciences, Providence, RI.

A. Richard Newton, Interface-Based Design; Introduction, University of California at Berkeley, Apr. 1999.

Matthew T. O'Keefe et al., Designing Fibre Channel Storage Area Networks, Feb. 2001.

Derek C. W. Pao, A Congestion Control Algorithm for Multipoint-to-Multipoint ABR Service in ATM Network, Proceedings of the IEEE Conference on High Performance Switching and Routing, Jun. 26, 2000, pp. 167-175, IEEE, New York, NY.

Parameswaran Ramanathan et al., Resource Placement with Multiple Adjacency Constraints in k-ary n-Cubes, 1995.

Staffan Bo Strand, Storage Area Networks and SANTK, Thesis, Dec. 2001, University of Minnesota, Minneapolis, MN.

Staffan Strand, Automatic Generation of Core/Edge Topology SANs Using SANTK, May 23, 2002.

Joachim P. Walser, Solving Linear Pseudo-Boolean Constraint Problems with Local Search, Proceedings of the 14th National Conference on Artificial Intelligence, 1997, pp. 269-274, AAAI Press, Menlo Park, CA.

Julie Ward, U.S. Appl. No. 09/707,227, filed Nov. 6, 2000.

Julie Ward et al., Storage Area Network Fabric Design, PowerPoint presentation given at the Math Sciences Research Institute for Combinatorial Design, Berkeley CA, Nov. 8, 2000.

I. Widjaja et al., Performance Issues in VC-Merge Capable ATM LSRs, RFC 2682, Sep. 1999, The Internet Society, Reston, VA.

Ward, Julie, et al., "Storage Area Network Fabric Design," PowerPoint presentation given at the Math Sciences Research Institute Conference on Combinatorial Design, Berkeley, California, Nov. 8, 2000.

Ward, Julie, et al., "Storage Area Network (SAN) Fabric Design," Powerpoint presentation given at the INFORMS International Conference, Maui, Hawaii, Jun. 19, 2001.

Ward, Julie, et al., "Storage Area Network (SAN) Fabric Design," Powerpoint presentation given at Berkeley, IEOR Department Seminar, Berkeley, California, Oct. 8, 2001.

* cited by examiner

RELIABILITY FOR INTERCONNECT FABRICS

This is a continuation-in-part of U.S. application Ser. No. 09/707,227, filed Nov. 16, 2000, the contents of which are hereby incorporated by reference.

FIELD OF THE INVENTION

The present invention relates to the field of networks. More particularly, this invention relates to reliability of networks.

BACKGROUND OF THE INVENTION

An interconnect fabric provides for communication among a set of nodes in a network. Communications originate within the network at a source node and terminate at a terminal node. Thus, a wide variety of networks may be viewed as a set of source nodes that communicate with a set of terminal nodes via an interconnect fabric. For example, a storage area network may be arranged as a set of computers as source nodes which are connected to a set of storage devices as terminal nodes via an interconnect fabric that includes communication links and devices such as hubs, routers, switches, etc. Devices such as hubs, routers, switches, etc., are hereinafter referred to as interconnect devices. Depending on the circumstances, a node may assume the role of source node with respect to some communications and of terminal node for other communications.

The communication requirements of an interconnect fabric may be characterized in terms of a set of flow requirements. A typical set of flow requirements specifies the required communication bandwidth from each source node to each terminal node. The design of an interconnect fabric usually involves selecting the appropriate arrangement of physical communication links and interconnect devices and related components that will meet the flow requirements.

An interconnect fabric that meets the minimum flow requirements under ideal conditions will not necessarily meet the flow requirements under other conditions, such as in the event of a failure of a communication link, interconnect device or related component. Therefore, network designers typically address these reliability considerations by building in excess capacity or redundancy to help meet flow requirements under adverse conditions. Prior techniques are largely ad hoc and, thus, tend to be time-consuming, error-prone and may result in an over-provisioned interconnect fabric.

SUMMARY OF THE INVENTION

A technique is disclosed for providing reliability to an interconnect fabric for communication among a set of nodes. The technique may be used to efficiently and programmatically produce a cost-effective interconnect fabric having a degree of reliability over a range of design problems.

In one aspect, a method provides reliability to an interconnect fabric for communication among a set of nodes. Ports associated with each node are partitioned into a first set of ports and a second set of ports. A first interconnect fabric is formed among the first set of ports for each node in response to a set of flow requirements. A second interconnect fabric is formed among the second set of ports.

In another aspect a system provides reliability to a design for an interconnect fabric for communication among a set of nodes. A set of design information includes a set of flow requirements for the interconnect fabric. A fabric design tool generates a first design for the interconnect fabric among of first set of ports for each node, the first design being in response to the flow requirements, and also generates a second design for the interconnect fabric among a second set of ports for each node.

The first interconnect fabric may be formed by generating arrangements of flow sets in response to a set of flow requirements, determining one or more port violations with respect to the first set of ports for each node and alleviating at least one of the port violations by merging a pair of the flow sets. The second interconnect fabric may be formed in response to the same set of flow requirements or in response to a relaxed set of flow requirements. Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

Figure 1:
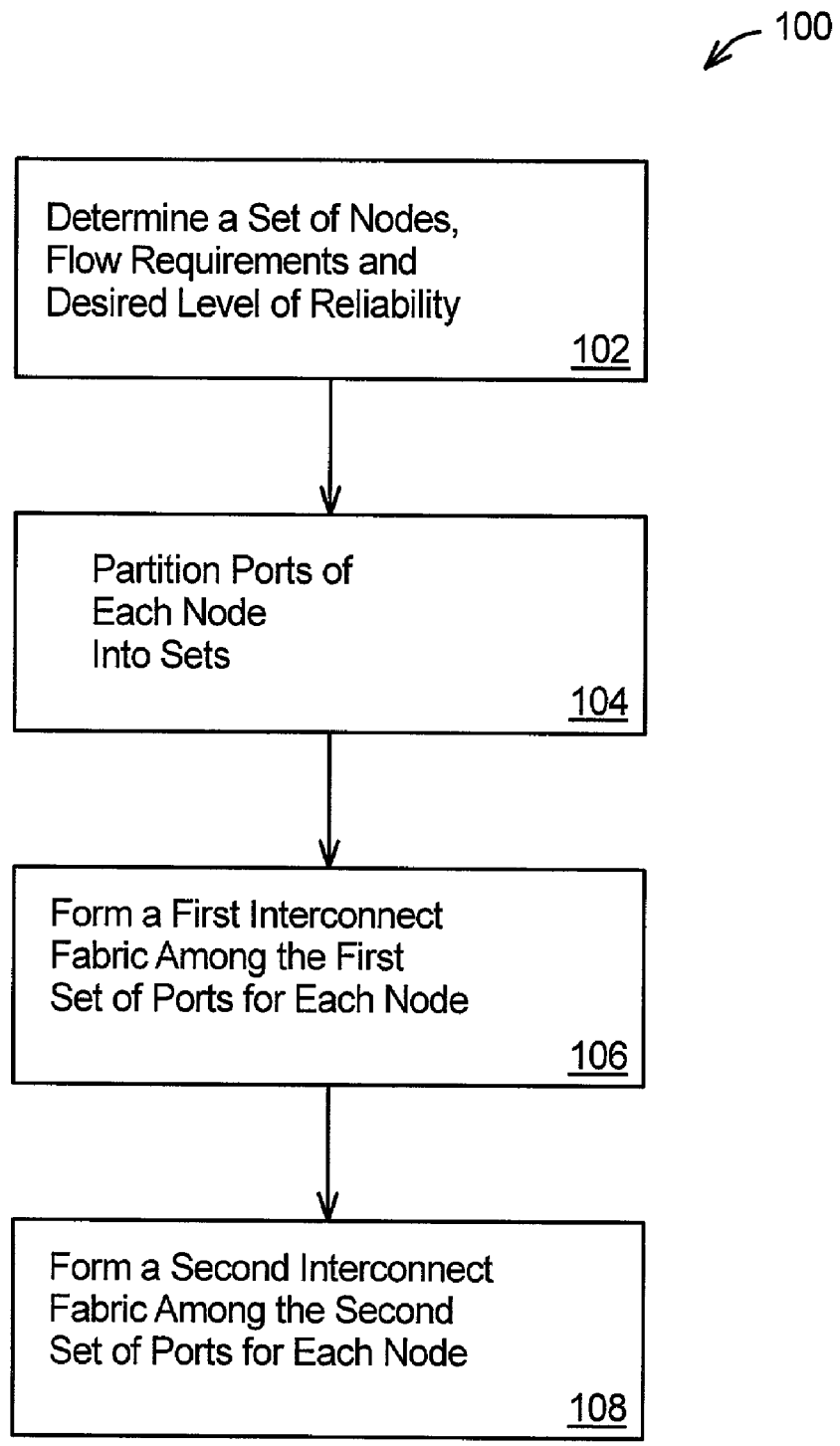
FIG. 1 shows a method for providing reliability to an interconnect fabric according to an embodiment of the present invention.

FIG. 1 shows a method 100 for providing reliability to an interconnect fabric according to an embodiment of the present invention. The method 100 partitions ports at each node into sets and forms interconnect fabrics among the ports of each set based on flow requirements among the nodes. Reliability is provided because multiple fabrics interconnect the nodes. In the event of a failure in one of the interconnect fabrics, another one of the interconnect fabrics may allow communications which would otherwise not occur due the failure.

In a step 102, a set of nodes to be interconnected by an interconnect fabric, and flow requirements among the nodes, are determined. Table 1 shows an example set of flow requirements for an interconnect fabric under design.

|  | Terminal Node 50 | Terminal Node 52 | Terminal Node 54 |
| --- | --- | --- | --- |
| Source Node 40 | a | b | c |
| Source Node 42 | d | e | f |
| Source Node 44 | — | g | h |

The flow requirements in this example specify three source nodes (source nodes 40–44 in the figures below) and three terminal nodes (terminal nodes 50–54 in the figures below). If an interconnect fabric is to meet the flow requirements, it must contain communication paths between all pairs of the source and terminal nodes 40–44 and 50–54 having positive flow requirements and must have sufficient bandwidth to support all of the flow requirements simultaneously.

In one embodiment, the source nodes 40–44 are host computers and terminal nodes 50–52 are storage devices and the bandwidth values a-h are numbers expressed in units of megabits per second. Thus, the interconnect fabric under design may be storage area network.

In other embodiments, there may be multiple flow requirements between a given source and terminal node pair. In such embodiments, the cells of Table 1 would contain a list of two or more entries. And, depending on the circumstances, a node may assume the role of source node with respect to some communications and of terminal node for other communications.

Figure 2:
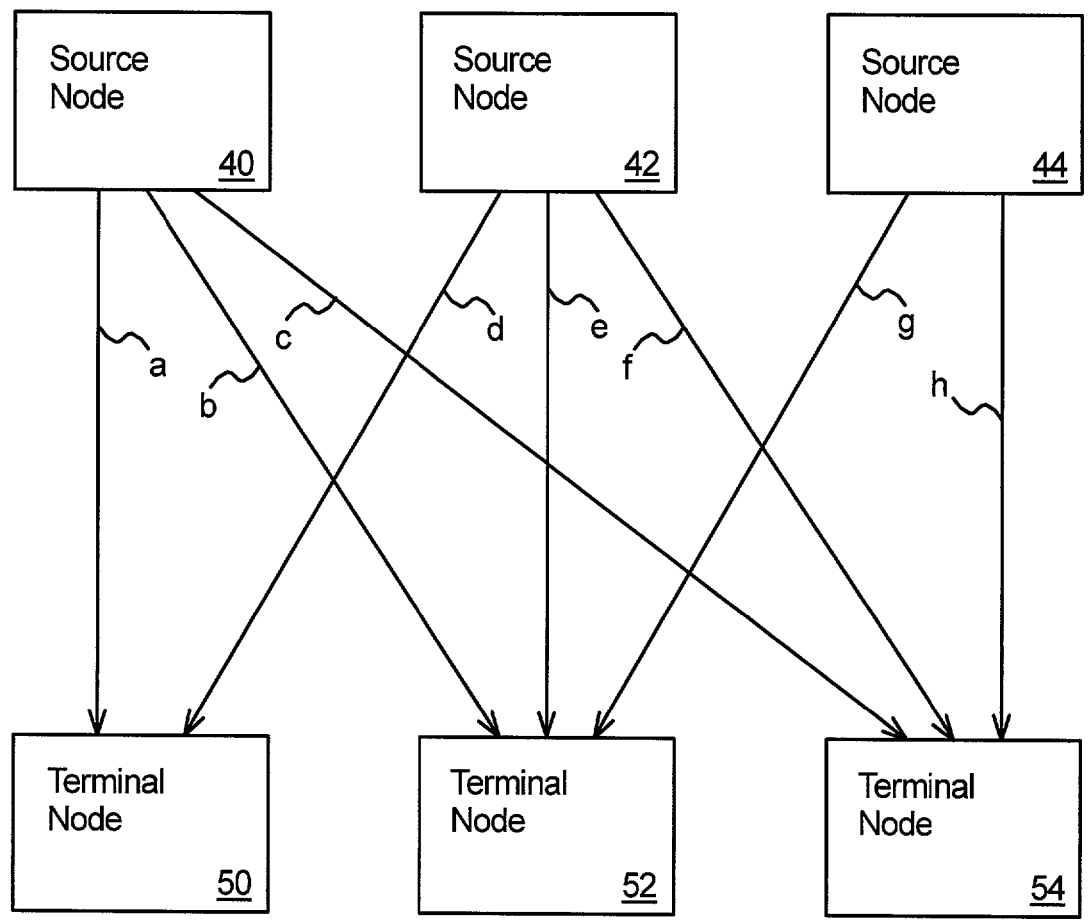
FIG. 2 shows an arrangement of flow sets in an interconnect fabric for an example design according to an embodiment of the present invention.

FIG. 2 shows an initial arrangement of flows for the flow requirements obtained at step 102 for this example. Each entry in the flow requirements table is represented by a communication path or flow between pairs of nodes. More particularly, flow a is between the source node 40 and terminal node 50, flow b is between source node 40 and terminal node 52, flow c is between source node 40 and terminal node 54, flow d is between source node 42 and terminal node 50, flow e is between source node 42 and terminal node 52, flow f is between source node 42 and terminal node 54, flow g is between source node 44 and terminal node 52, and flow h is between source node 44 and 54.

In addition, a desired level of reliability may be determined. For example, the desired level may be full-redundancy, in which the flow requirements continue to be met despite a failure of any single node port, link, or interconnect device in the interconnect fabric. As another example, the desired level may relaxed to something less than full-redundancy to provide a lower level of performance in the event of a failure. For example, to reduce costs, a lower level of bandwidth may be provided between pairs of nodes after a failure than would be desired under normal operating conditions. In one aspect, the bandwidth requirement for one or more flows could be reduced by a percentage or eliminated entirely.

Figure 3:
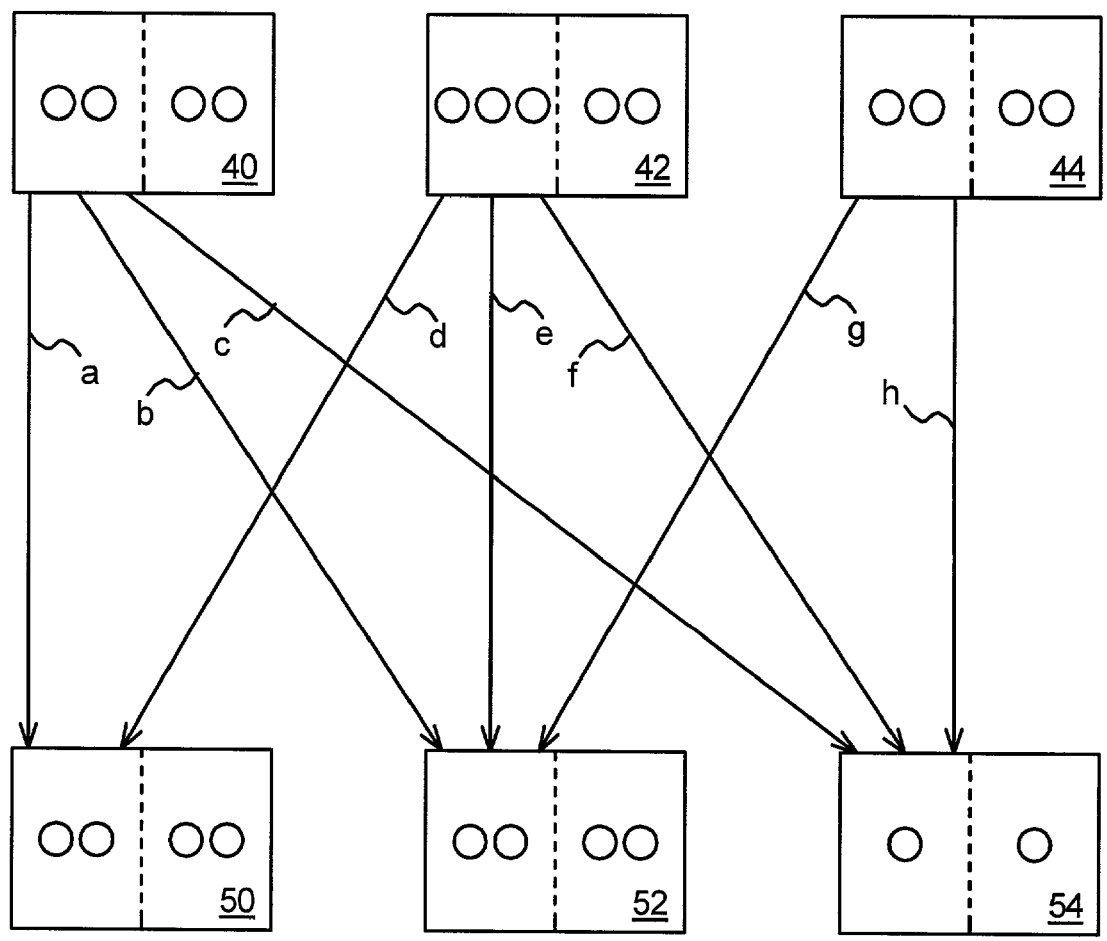
FIG. 3 shows how ports at each node may be partitioned into sets for the example design according to an embodiment of the present invention.

At step 104, the ports of each node may be partitioned into sets. For example, the ports at each node may be divided into two sets. In other embodiments, the ports of each node could be further divided into an additional number of (k) sets. In which case, additional fabrics may used to interconnect the additional sets of ports to provide even greater redundancy and reliability. FIG. 3 shows how ports at each node may be partitioned into two sets for the example design. In the example, each of nodes 40, 44, 50 and 52 has four ports. These ports may be partitioned into first and second sets, each with an equal number of ports. Also, in the example, node 42 has five ports. If a node has an odd number of ports (given by: 2n+1), they may be partitioned into two sets in which one set has one more port (given by: n+1) than the other set (given by: n). If a node has only one port, the port may be split among the sets by connecting an interconnect device having at least three ports, such as a hub or repeater, to the port. The remaining ports of the interconnect device may then be partitioned into the sets as ports belonging to the node.

In the example, a first set for the node 42 includes three ports while a second set includes two ports. And, in the example, node 54 includes two ports which may be partitioned into first and second sets of one each. The first set of ports for each node is shown in FIG. 3 to the left of a dotted line which divides the node, while the second set of ports for each node is shown to the right of the dotted line.

In a step 106 (FIG. 1), a first interconnect fabric is formed among a first set of ports for each node. For full redundancy, each of the sets of ports in the example has the same flow requirements. Thus, the flows of FIG. 2 are shown in FIG. 3 as being supported by the first set of ports for each node.

Figure 4:
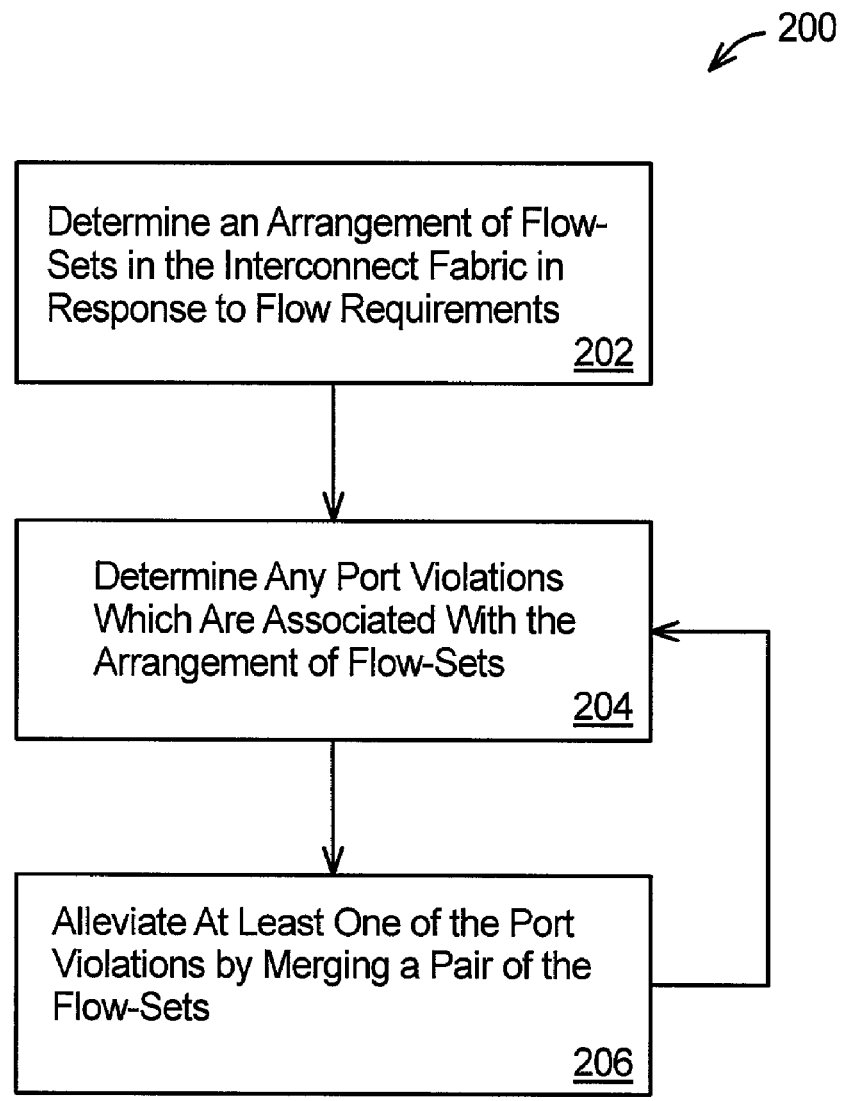
FIG. 4 shows a method for forming interconnect fabrics among corresponding sets of ports according to an embodiment of the present invention.

FIG. 4 shows a method 200 for forming an interconnect fabric among sets of ports according to an embodiment of the present invention. The method 200 is disclosed in U.S. application Ser. No. 09/707,227, filed Nov. 16, 2000, the contents of which are hereby incorporated by reference, and may be performed during the step 106 of FIG. 1. It will be apparent, however, that other techniques for forming an interconnect fabric, such as manual or other methods, may be used in the step 106.

The method 200 partitions the flow requirements of the interconnect fabric into flow sets and iteratively merges the flow sets while taking into account the feasibility and cost of the implementing the interconnect fabric.

At step 202, an arrangement of flow sets in the interconnect fabric is determined in response to the set of flow requirements for the source and terminal nodes. In one embodiment, step 202 is performed by generating a flow set for each flow specified in the flow requirements for the interconnect fabric. Thus, each of flows a, b, c, d, e, f, g and h of the example is initially included in a corresponding flow set having one flow.

At step 204, port violations which are associated with the arrangement of flow sets among the first set of ports are determined. In the example, port violations are determined for the first set of ports for each source node 40–42 and each terminal node 50–52. In general, the number of port violations is equal to the sum, over all flow sets, of the number of required physical communication links to the node from that flow set, minus the number of available ports in the first set of ports. Each flow set may require one or more physical communication links to a given source or terminal node in the network. In this example, the number of port violations for a node is equal to the number of flow sets connected to the node minus the number of available ports in first set of ports for the node because each flow set is carried by one physical communication link in the interconnect fabric.

In the example (FIG. 3), the source node 40 has a port violation of one since each of its three flow sets requires one physical communication link to the source node 40 and the source node 40 has only two available ports in the first set. The source nodes 42–44 and the terminal node 50 have no port violations since the number of ports in the first set is equal to the number of flow sets. The terminal node 52 has a port violation of one and the terminal node 54 has a port violation of two.

In other examples, the number of available ports in the first set for the source nodes 40–42 and the terminal nodes 50–52 may differ and the number of physical communication links required by a flow set on a given source or terminal node it connects to may exceed one.

At step 206 (FIG. 4), at least one of the port violations is alleviated by merging a pair of the flow sets. Step 206 initially involves selecting the pair of flow sets in the current interconnect fabric that are to be merged. Initially, a candidate pair of flow sets is chosen that would alleviate the port violation on a node with the greatest port violation if merged. If there is more than one such candidate pair then one of the candidate pairs that alleviates a port violation on a node having the next greatest port violation is chosen from among them. If there is more than one such candidate pair then a pair of them that would be least costly to merge is chosen. The cost of merging two candidate pairs may be determined by choosing the least expensive interconnect device that is feasible for the merged flow set.

In the current state of the example interconnect fabric shown in FIG. 3, the terminal node 54 has a port violation of two, which is the worst port violation in the network, and its corresponding flow sets are candidates for merging at step 206. For example, the pair of flow sets having flows c and f or the pair of flow sets having flows f and h or the pair of flow sets having flows c and h may be chosen as candidate pairs. All of these candidate pairs, if merged, would alleviate one port violation from the terminal node 54 but none of them would alleviate any other port violations. Therefore, the cost of merging the candidate pairs may be used to select the candidate pair of flow sets at step 206. For example, the communication link and/or interconnect device and/or ports that are used to merge the flow sets having flows c and f may be less expensive than the equivalent components needed to merge the other equally qualified candidate pairs. For example, assuming that link cost is related to length, replacing two links over a longer distance with a single link would likely reduce costs more than if over a shorter distance.

The candidate pairs of flow sets considered at step 206 must be feasible to merge. An example of a pair of flow sets that is not feasible to merge is a pair for which an interconnect device of sufficient bandwidth is not available. For example, a flow set having 60 units of bandwidth cannot be merged with a flow set having 50 units of bandwidth if the highest bandwidth interconnect device available is 100 units. Another example of a pair of flow sets that is not feasible to merge is a pair that would exceed the available ports on every available interconnect device of the resulting flow set. Candidate pairs that are not feasible to merge are bypassed at step 206 in favor of other candidate pairs.

If port violations still exist in the interconnect fabric after step 206, then another candidate pair of flow sets is selected and merged in a repeat of step 206. The method 200 loops through steps 204–206 in an iterative fashion until all port violations are eliminated or until no further merges are feasible.

Figure 5:
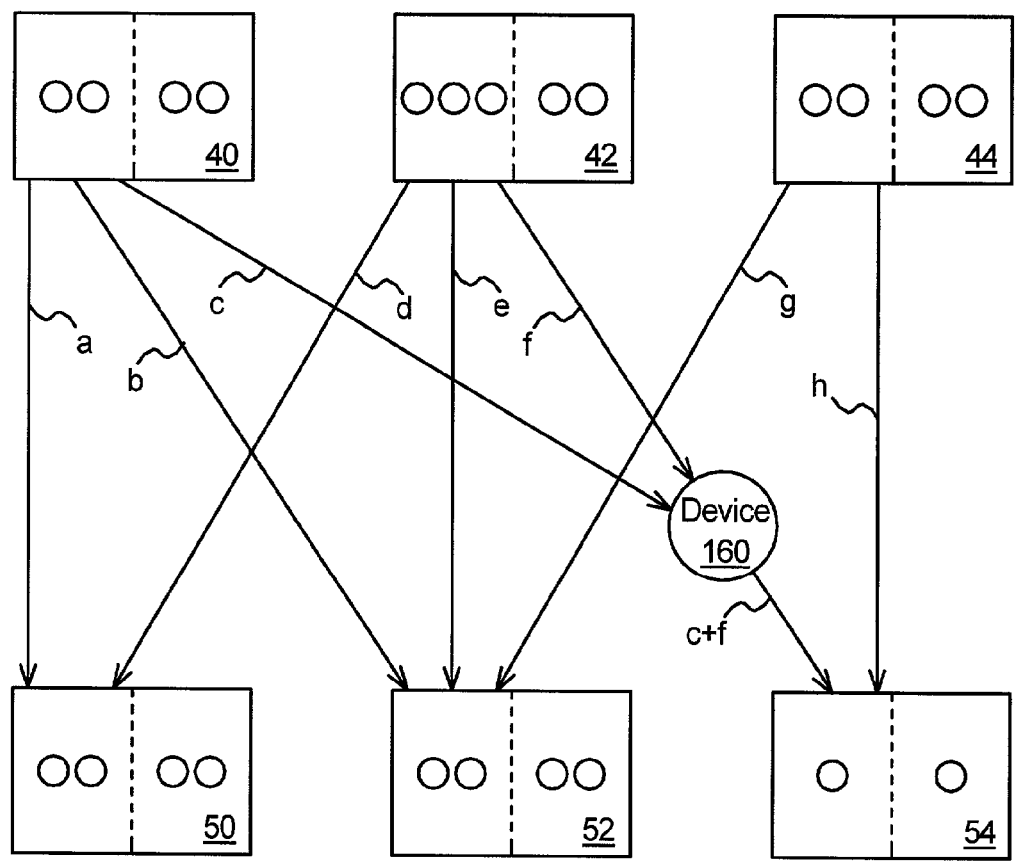
FIGS. 5–6 show a first interconnect fabric for the example design evolving according to an embodiment of the present invention.

FIG. 5 shows an interconnect fabric that results from the first pass through step 206. A flow set having an interconnect device 160, a flow of c, and a flow of f is the result of the merger of the flow set having the flow of c and the flow set having the flow of f. At this point, the interconnect fabric has a port violation of one at the source node 40 and a port violation of one at each of the terminal nodes 52 and 54. In the example, a next pass through step 206 may result in the selection and merger of the flow set corresponding to an interconnect device 162 and with the flows a and b which alleviates the port violation of the terminal node 50. Then, another pass through the set 206 may result in the selection and merger of the flow set corresponding to an interconnect device 164 and with the flows e and g which alleviates the port violation of the terminal node 54. A further pass through the step 206 may result in the selection and merger of the flow set corresponding to the interconnect device 160 and with the flow set including the flows c and f with the flow set including the flow h which alleviates the port violation of the terminal node 54.

Figure 6:
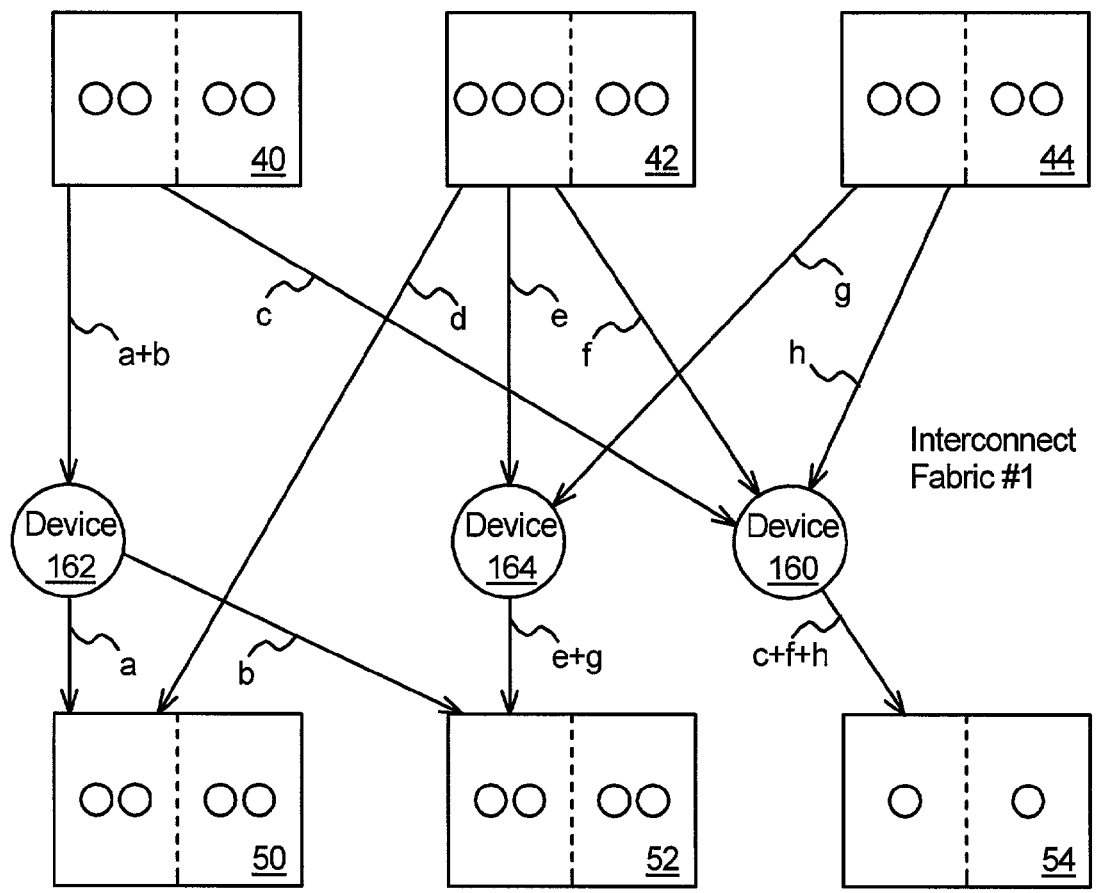

FIG. 6 shows an interconnect fabric that results from these additional passes through step 206. At this point, the interconnect fabric has no port violation remaining. Accordingly, FIG. 6 shows a first interconnect fabric that interconnects the first set of ports for each node and that will support the flow requirements for the network. Note that if cost savings may be obtained by merging additional flow sets, such mergers may also be accomplished by making another pass through step 206.

Returning to the method 100 of FIG. 1, once the first interconnect fabric has been formed in the step 106 among the first set of ports for each node, a second interconnect fabric may be formed in the step 108 among the second set of ports for each node. For the step 108, the method 200 or another method may be employed to form the second interconnect fabric. Assuming that the second interconnect fabric is to provide full-redundancy, the same flow requirements may be applied to the second interconnect fabric as were applied to the first fabric. A relaxed set of flow requirements may be used if a lower level of reliability is desired.

Figure 7:
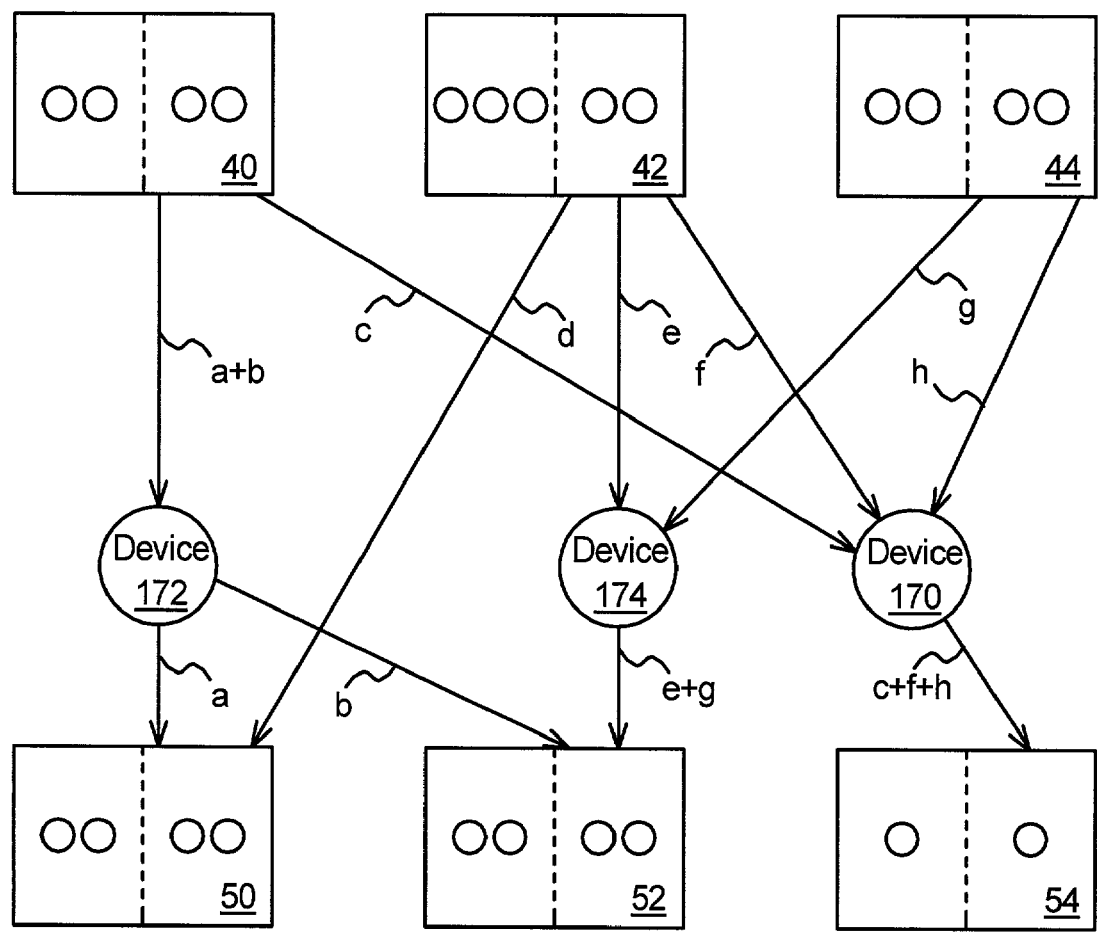
FIGS. 7–8 show a second interconnect fabric for the example design evolving according to an embodiment of the present invention.

FIG. 7 shows a second interconnect fabric for the example design. Assuming the method 200 is employed, the flow sets may be merged in the same manner as in FIG. 6. Thus, in the example, interconnect devices 170, 172 and 174 connect to the second set of ports of each node, whereas, the devices 160, 162 and 164 connect to the first set of ports of each node. FIG. 7 shows that the interconnect device 170 merges flows c, f and h and corresponds to the interconnect device 160 of FIG. 6, the interconnect device 172 merges flows a and b and corresponds to the interconnect device 162 of FIG. 6 and the interconnect device 174 merges flows e and g and corresponds to the interconnect device 164 of FIG. 6.

However, because fewer ports are available in the second set at the node 42, there remains a port violation at node 42 for the second interconnect fabric. Thus, at least one additional merger is required. Note that in FIG. 6, each flow set has at most one interconnect device associated with it and all of the flows for the flow set are routed through that interconnect device or a single communication link, if possible. Thus, the method 200 generally results in a fabric design of a single layer in which there are no links between device nodes.

Under certain circumstances, a single-layer fabric may not eliminate all of the port violations. In which case, the method 200, by itself, may not result in a fabric design in which there are no port violations. Returning to FIG. 7, no additional merges of flow sets are feasible using the method 200. For example, to relieve the port violation, two of the flow sets having flows d, e or f would need to be merged. However, the flow set having flow e has already been merged by the device 174 and the flow set having flow f has already been merged by the device 170.

Thus, in one embodiment, the present invention may address remaining port violations by recursively generating one or more additional layers of interconnect fabric nodes. For port violations at source nodes, the problem (i.e. the current fabric configuration and the applicable design information) may be recast such that the device nodes are treated as the terminal nodes. Then, one or more additional layers of device nodes may be inserted between the source nodes and the device nodes to relieve the port violations at source nodes. This results in links between device nodes and, thus, increases the number of layers in the interconnect fabric. Similarly, for terminal port violations, the problem may be recast such that the device nodes are treated as the source nodes. Then, one or more additional layers of device nodes may be inserted in between the device nodes and the terminal nodes to relieve the terminal node port violations. This also results in links between the device nodes and, thus, increases the number of layers in the interconnect fabric. Such a technique is disclosed in co-pending U.S. application Ser. No. 10/027,564, entitled, "Designing Interconnect Fabrics," and filed Dec. 19, 2001, the contents of which are hereby incorporated by reference and which is continuation-in-part of U.S. application Ser. No. 09/707,227, filed Nov. 16, 2000.

The above-technique may be performed during the steps 104 or 106 of FIG. 1, as needed. Thus, in the example of FIG. 7, because there remains a port violation at a source node 42, the devices 170, 172 and 174 may be recast as terminal nodes. In addition, while there is no device in the flow set having flow d, this link can itself be treated as a terminal node. Alternately, a "dummy" node that is equivalent to a two-port hub or repeater, may be inserted into the link and the dummy node treated as a terminal node. Then, the method 200 of FIG. 4 may be applied by merging flow sets to alleviate the port violation.

Figure 8:
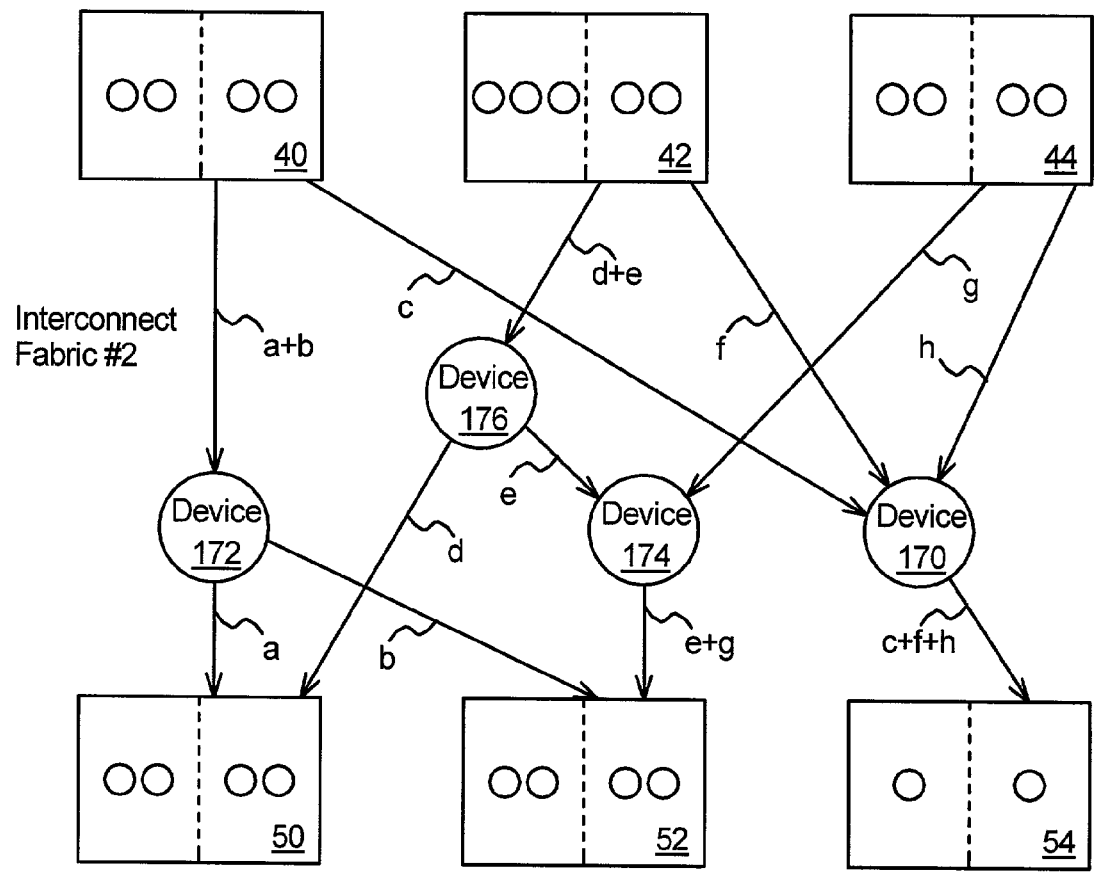

FIG. 8 shows the second interconnect fabric of the example with the addition of a device 176 which merges the flow set having flow d with the flow set having flow e. Note that there is now a link between the device 174 and the device 176 and that there is no longer a port violation at the node 42. Accordingly, the addition of the device 176 adds a layer to the interconnect fabric.

Figure 9:
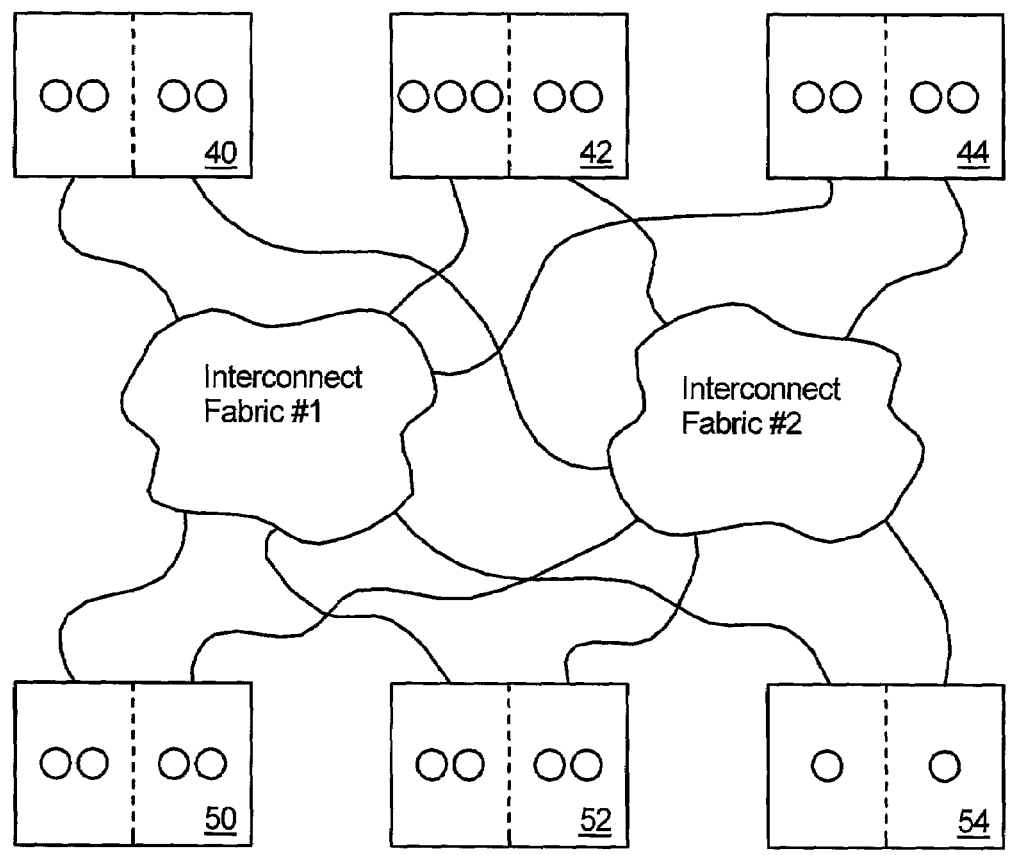
FIG. 9 shows first and second interconnect fabrics for the example design according to an embodiment of the present invention.

FIG. 9 shows first and second interconnect fabrics for the example design according to an embodiment of the present invention. As shown in FIG. 9, the two fabrics simultaneously connect the nodes. Reliability is enhanced because, in the event of a failure of any single element of the first interconnect fabric, the flows among the nodes can still be achieved by the second interconnect fabric.

Figure 10:
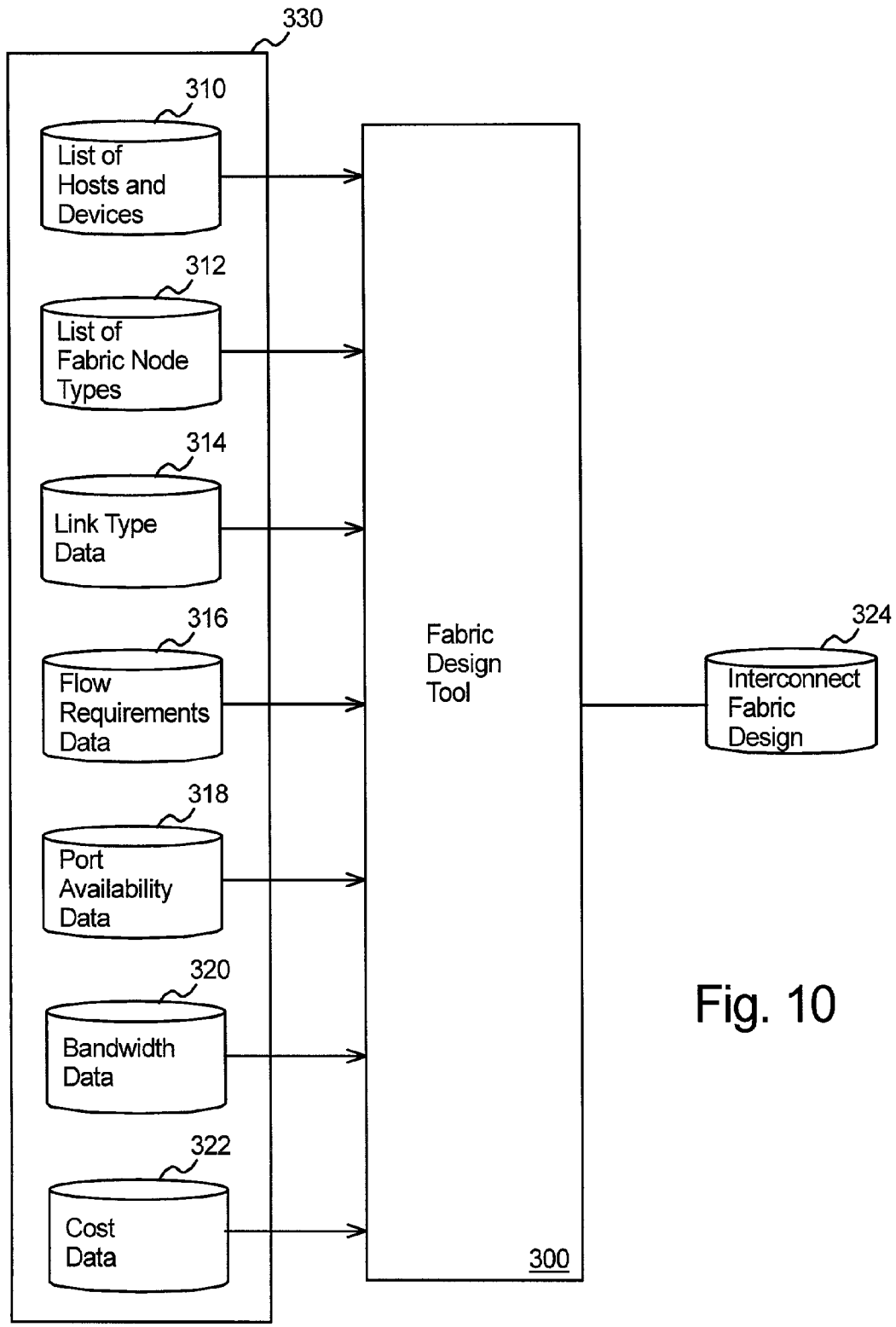
FIG. 10 shows a fabric design tool that may employ techniques of the present invention to provide reliability to an interconnect fabric design.

FIG. 10 shows a system having a fabric design tool 300 that may employ the method 100 (and the method 200) to provide reliability to an interconnect fabric in response to a set of design information 330. The fabric design tool 300 may be implemented in software and/or hardware to perform its functions. The design information 330 in one embodiment includes a list of hosts (source nodes) and devices (terminal nodes) 310, a list of fabric node types 312, a list of link type data 314, a set of flow requirements data 316, a set of port availability data 318, a set of bandwidth data 320, and a set of cost data 322. The design information 330 may be implemented as an information store, such as a file or set of files or a database, etc.

The list of hosts and devices 310 may specify the hosts and devices which are to be interconnected by an interconnect fabric design 324.

The list of fabric node types 312 may specify available interconnect devices, such as hubs, routers, switches, etc.

The link type data 314 may specify a list of available communication links that may be employed in the interconnect fabric design 324 and any relevant constraints. There are numerous examples of available communication links including fiber optic links, fibre channel links, wire-based links, and links such as SCSI as well as wireless links.

The flow requirements data 316 may specify the desired flow requirements for the interconnect fabric design 322. The desired flow requirements may include bandwidth requirements for each pairing of the source and terminal nodes.

The port availability data 318 may specify the number of communication ports available on each source node and each terminal node and each available interconnect device.

The bandwidth data 320 may specify the bandwidth of each host and device port and each type of fabric node and link.

The cost data 322 may specify costs associated with the available communication links and interconnect devices that may be employed in the interconnect fabric design 324. The cost data 322 may also specify the costs of ports for source and terminal nodes and interconnect devices. Other relevant costs may also be indicated.

The interconnect fabric design 324 generated by the fabric design tool 100 includes a list of the physical communication links and interconnect devices and ports, etc. and may include cost data.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method of providing reliability to an interconnect fabric for communication among a set of nodes, the method comprising:

partitioning ports associated with each node into a first set of ports and a second set of ports, the first set of ports comprising at least one port of each node and the second set of ports comprising at least one other port of each node;

forming a first interconnect fabric among the first set of ports for meeting a set of flow requirements, the set of flow requirements specifying communication bandwidth requirements between pairs of the nodes and the first interconnect fabric comprising a plurality of communication links and at least one interconnect device coupled to three or more of the communication links; and forming a second interconnect fabric among the second set of ports.

2. The method according to claim 1, wherein said forming the first interconnect fabric comprises generating arrangements of flow sets in response to the flow requirements, determining one or more port violations with respect to the first set of ports for each node and alleviating at least one of the port violations by merging a pair of the flow sets.

3. The method according to claim 1, wherein said set of nodes includes source nodes and terminal nodes.

4. The method according to claim 1, said partitioning further comprising partitioning the ports associated with each node into a number of additional sets of ports.

5. The method according to claim 4, further comprising forming additional interconnect fabrics among the additional sets of ports.

6. The method according to claim 1, wherein said forming said second interconnect fabric is performed to meet the set of flow requirements.

7. The method according to claim 1, wherein said forming said second interconnect fabric is performed to meet a relaxed set of flow requirements.

8. The method according to claim 7, wherein the relaxed set of flow requirements for the second interconnect fabric comprise reduced bandwidth requirements between pairs of the nodes, the reduced bandwidth requirements being a percentage of the bandwidth requirements between the pairs for the nodes for the first interconnect fabric.

9. The method according to claim 1, wherein a node has an odd number of ports equal to 2n+1, the first set of ports includes n+1 ports and the second set of ports includes n ports.

10. The method according to claim 1, wherein when a node has only one port, further comprising a step of coupling an interconnect device to the port.

11. The method according to claim 1, wherein the second set of ports includes fewer ports of at least one node than the first set of ports.

12. The method according to claim 1, wherein the second interconnect fabric comprises a plurality of second communication links and at least one interconnect device coupled to three or more of the second communication links.

13. A system for providing reliability to a design for an interconnect fabric for communication among a set of nodes, the system comprising:
    means for storing a set of design information including a set of flow requirements for the interconnect fabric, the set of flow requirements specifying communication bandwidth requirements between pairs of the nodes; and
    a fabric design tool that partitions ports associated with each node into a first set of ports and a second set of ports, the first set of ports comprising at least one port of each node and the second set of ports comprising at least one other port of each node and that generates a first design for the interconnect fabric among the first set of ports, the first design for meeting the flow requirements and the first design specifying a plurality of communication links and at least one interconnect device coupled to three or more of the communication links, and that generates a second design for the interconnect fabric among the second set of ports.

14. The system according to claim 13, wherein said fabric design tool generates arrangements of flow sets in response to the flow requirements, determines one or more port violations with respect to the first set of ports for each node and alleviates at least one of the port violations by merging a pair of the flow sets.

15. The system according to claim 13, wherein said set of nodes includes source nodes and terminal nodes.

16. The system according to claim 13, wherein said fabric design tool further partitions the ports associated with each node into a number of additional sets of ports.

17. The system according to claim 16, wherein said fabric design tool forms additional interconnect fabrics among the additional sets of ports.

18. The system according to claim 13, wherein said fabric design tool forms said second interconnect fabric to meet the set of flow requirements.

19. The system according to claim 13, wherein said fabric design tool forms said second interconnect fabric to meet a relaxed set of flow requirements.

20. The system according to claim 19, wherein the relaxed set of flow requirements for the second interconnect fabric comprise reduced bandwidth requirements between pairs of the nodes, the reduced bandwidth requirements being a percentage of the bandwidth requirements between the pairs for the nodes for the first interconnect fabric.

21. The system according to claim 13, wherein node has an odd number of ports equal to 2n+1, the first set of ports includes n+1 ports of the node and the second set of ports includes n ports of the node.

22. The system according to claim 13, wherein when a node has only one port, an interconnect device coupled to the port is added to the design prior to the fabric design tool partitioning the ports into the first set of ports and the second set of ports.

23. The system according to claim 13, wherein the second set of ports includes fewer ports of at least one node than the first set of ports.

24. The system according to claim 13, wherein the second design for the interconnect fabric specifies a plurality of second communication links and at least one interconnect device coupled to three or more of the second communication links.

* * * * *

UNITED STATES PATENT AND TRADEMARK OFFICE
CERTIFICATE OF CORRECTION

PATENT NO. : 7,032,013 B2  Page 1 of 1
APPLICATION NO. : 10/027589
DATED : April 18, 2006
INVENTOR(S) : Julie Ann Ward et al.

It is certified that error appears in the above-identified patent and that said Letters Patent is hereby corrected as shown below:

In column 9, line 12, in Claim 9, after "n+1 ports" insert -- of the node --.

In column 9, line 13, in Claim 9, delete "ports." and insert -- ports of the node. --, therefor.

In column 9, line 16, in Claim 10, delete "port." and insert -- port prior to the partitioning so that a plurality of ports of the port-coupled interconnect device are associated with the node. --, therefor.

In column 10, line 26, in Claim 21, after "wherein" insert -- a --.

Signed and Sealed this

Thirteenth Day of April, 2010

David J. Kappos
*Director of the United States Patent and Trademark Office*